United States Patent
Karve et al.

(10) Patent No.: US 10,552,197 B2
(45) Date of Patent: Feb. 4, 2020

(54) INEXACT RECONSTITUTION OF VIRTUAL MACHINE IMAGES

(71) Applicant: International Business Machines Corporation, Armonk, NY (US)

(72) Inventors: Alexei Karve, Mohegan Lake, NY (US); Andrzej Kochut, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/879,862

(22) Filed: Jan. 25, 2018

(65) Prior Publication Data

US 2019/0227830 A1    Jul. 25, 2019

(51) Int. Cl.
    *G06F 9/455* (2018.01)
(52) U.S. Cl.
    CPC ...... *G06F 9/45558* (2013.01); *G06F 2009/45562* (2013.01); *G06F 2009/45595* (2013.01)
(58) Field of Classification Search
    None
    See application file for complete search history.

(56) References Cited

U.S. PATENT DOCUMENTS

| | | | |
|---|---|---|---|
| 5,664,189 A | 9/1997 | Wilcox et al. | |
| 5,823,958 A | 10/1998 | Truppe | |
| 7,356,679 B1 | 4/2008 | Le et al. | |
| 7,949,090 B2 | 5/2011 | Hagiwara et al. | |
| 8,335,553 B2 | 12/2012 | Rubner et al. | |
| 9,274,818 B2 | 3/2016 | Karve et al. | |
| 9,286,182 B2 | 3/2016 | Fries et al. | |
| 9,753,761 B1* | 9/2017 | Palekar | G06F 9/45533 |
| 9,792,141 B1* | 10/2017 | Sethuramalingam | G06F 8/63 |
| 9,910,906 B2* | 3/2018 | Karve | G06F 16/27 |
| 2015/0169343 A1* | 6/2015 | Lissack | G06F 9/45533 718/1 |
| 2016/0378844 A1 | 12/2016 | Karve et al. | |
| 2016/0380840 A1 | 12/2016 | Karve et al. | |

(Continued)

OTHER PUBLICATIONS

Ammons, G., et al., "Virtual machine images as structured data: the Mirage image library", http://citeseerx.ist.psu.edu/viewdoc/download?doi=10.1.1.400.8523&rep=rep1&type=pdf, Accessed on Jan. 24, 2018, 6 pages.

(Continued)

*Primary Examiner* — Bradley A Teets
(74) *Attorney, Agent, or Firm* — Scully, Scott, Murphy & Presser, P.C.; JoAnn Kealy Crockatt

(57) ABSTRACT

Reconstituting a machine image separates constituent parts of a machine image, and for each part, determines whether an exact version of the part is available on the target machine. If an exact version of the part is not available on the target machine, an inexact part is looked for on the target machine. Whether an inexact part is found may be determined based on attribute policy specification and similarity computation. For the inexact part found on the target machine, any dependencies may be identified and processed as a part to be reconstituted for the machine image. If no exact part and no inexact part are found on the target machine, the part is transferred from a source machine to the target machine. A machine image is created based on parts.

20 Claims, 8 Drawing Sheets

(56) References Cited

U.S. PATENT DOCUMENTS

2017/0262307 A1* 9/2017 Venkatesh .......... G06F 16/1794

OTHER PUBLICATIONS

McCormick, C., "MinHash Tutorial with Python Code", http://mccormickml.com/2015/06/12/minhash-tutorial-with-python-code/, Jun. 12, 2015, Accessed on Jan. 24, 2018, 9 pages.
Leskovec, J., et al., "Chapter 3: Finding Similar Items", Mining of Massive Datasets (MMDS: Beta Version of Third Edition), components of the Third Edition, http://infolab.stanford.edu/~ullman/mmds/ch3.pdf, Accessed on Jan. 24, 2018, pp. 72-134.
Demirbas, M., "Scaling Memcache at Facebook", http://muratbuffalo.blogspot.com/2013/05/scaling-memcache-at-facebook.html, May 27, 2013, Accessed on Jan. 23, 2018, 3 pages.
Piccolo, S.R., et al., "Tools and techniques for computational reproducibility", Preprint first posted online Jul. 17, 2015, 43 pages, now published in GigaScience, Dec. 1, 2016, pp. vol. 5, Issue 1.
Olston, C.A.R., "Approximated Replication", Stanford University Dissertation, Jun. 2003, 197 pages.
Campello, D., et al., "Coriolis: Scalable VM Clustering in Clouds", International Conference on Autonomic Computing, Dec. 2013, 5 pages.
Rai, A., et al., "MiG: Efficient Migration of Desktop VMs using Semantic Compression", 2013 USENIX Annual Technical Conference (USENIX ATC' 13), Jun. 24-28, 2013, pp. 25-36.
Kornblum., J., "Identifying almost identical files using context triggered piecewise hashing", Digital Investigation, Sep. 2006, pp. S91-S97, vol. 3, Supplement.
Kornblum., J., "Fuzzy Hashing", ManTech SMA, Computer Forensics & Intrusion Analysis, http://jessekornblum.com/presentations/htcia06.pdf, Accessed on Jan. 23, 2018, 38 pages.
Shadow Server, "Fuzzy Clarity: Using Fuzzy Hashing Techniques to Identify Malicious Code", http://www.shadowserver.org/wiki/uploads/Information/FuzzyHashing.pdf, Accessed on Jan. 23, 2018, 18 pages.
Kumar, R., "Locality Sensitive Hashing", https://users.soe.ucsc.edu/~niejiazhong/slides/kumar.pdf, Accessed on Jan. 23, 2018, 50 pages.
Broder, A.Z., "On the resemblance and containment of documents", http://gatekeeper.dec.com/ftp/pub/dec/SRC/publications/broder/positano-final-wpnums.pdf, Accessed on Jan. 23, 2018, 9 pages.
Singh, S., et al., An Effective Mechanism to Neutralize the Semantic Gap in Content Based Image Retrieval (CBIR), The International Arab Journal of Information Technology, Mar. 2014, pp. 124-133, vol. 11, No. 2.
Bjelland, P.C., et al., "Practical use of Approximate Hash Based Matching in digital investigations", Digital Investigation, May 2014, pp. S18-S26, vol. 11, Supplement 1.

\* cited by examiner

INEXACT RECONSTITUTION OF VIRTUAL MACHINE IMAGES

FIELD

The present application relates generally to computers and computer applications, and more particularly to reconstituting virtual machine images.

BACKGROUND

Replication of virtual machine (VM) images requires exact matching of chunks or blocks of data. For example, virtual machine images and compressed binary data require evaluating byte level commonalities for unknown content types. Collision resistant cryptographic hashes such as Message Digest 5 (MD5), Secure Hashing Algorithm 1 (SHA1), and Secure Hashing Algorithm 2 (SHA2) may be used for exact matching. Once all required blocks are available on a target node, the image can be reconstituted. Alternatively, the blocks may be streamed or fetched on demand. Content introspection can produce a non-bit-for-bit copy of the file system thus reproducing syntactically same images.

Lossy compression is commonly used to compress multimedia data (audio, video, and images), especially in applications such as streaming media and internet telephony. By contrast, lossless compression is typically required for text and data files, such as bank records, text articles and virtual machine images.

Yet another form of replication of content may use temporal staleness where replication is done with reduced frequency based on application-specific precision metrics. This approximate replication may be useful for applications that can work with slightly stale data for insulating a backend storage service from excessive load, for example, high read rates with very high fan-out.

Replaying or recreating virtual machines (VMs) or containers using build files is a technique to support computational reproducibility. Since virtual machine files are large, e.g., multiple gigabytes, especially if they include raw data files, the scripts and code may be stored in public repositories separately from the virtual machine, so others can examine and extend the analysis more easily and in turn generate the images.

Existing methods use exact replication mechanisms for VM images across data centers. Exact replication may be infeasible in many situations due to potentially high communication costs incurred or the high rate of churn of virtual machine images, for example in development/operations (DevOps) environments.

BRIEF SUMMARY

A method and system of reconstituting a virtual machine image may be provided. The method, in one aspect, may include receiving a specification of a virtual machine image identifying attributes of the virtual machine image, a policy specification associated with the attributes of the virtual machine image, and an identifier of a target machine on which the virtual machine image is to be reconstituted. The method may also include identifying constituent parts of the virtual machine image based on the specification. The method may further include queuing the constituent parts, part by part, in a queue. The method may also include processing the queue. The processing of the queue may include removing a part from the queue and determining whether the part is available on the target machine. Responsive to determining that the part is available on the target machine, the method may include marking the part as available on the target machine. Responsive to determining that the part is not available on the target machine, the method may include determining whether an inexact part corresponding to the part is available on the target machine based on the policy specification. Responsive to determining that the inexact part is not available on the target machine, the method may include transferring the part from a source machine via a communication network to the target machine and marking the part as available on the target machine. Responsive to determining that the inexact part is available on the target machine, the method may include determining whether the inexact part is convertible to a format of the part. Responsive to determining that the inexact part is convertible to the format of the exact part, the method may include converting the inexact part to the format of the part and marking the part as available on the target machine. Responsive to determining that the inexact part is not convertible to the format of the exact part, the method may include marking that inexact part is available on the target machine and converting any dependencies associated with the inexact part to a dependent part and queuing the dependent part in the queue. The method may further include repeating the processing of the queue until the queue is empty. The method may also include creating a virtual machine image comprising the parts and the inexact parts that have been marked as available on the target machine.

A system of reconstituting a virtual machine image, in one aspect, may include a hardware processor and a memory coupled with the hardware processor. The hardware processor may be operable to perform receiving a specification of a virtual machine image identifying attributes of the virtual machine image, a policy specification associated with the attributes of the virtual machine image, and an identifier of a target machine on which the virtual machine image is to be reconstituted. The hardware processor may be further operable to perform identifying constituent parts of the virtual machine image based on the specification. The hardware processor may be further operable to perform queuing the constituent parts, part by part, in a queue stored in the memory. The hardware processor may be further operable to perform processing the constituent parts in the queue. The hardware processor processing the constituent parts in the queue may include removing a part from the queue and determining whether the part is available on the target machine. Responsive to determining that the part is available on the target machine, the hardware processor may be further operable to perform marking the part as available on the target machine. Responsive to determining that the part is not available on the target machine, the hardware processor may be further operable to perform determining whether an inexact part corresponding to the part is available on the target machine based on the policy specification. Responsive to determining that the inexact part is not available on the target machine, the hardware processor may be further operable to perform transferring the part from a source machine via a communication network to the target machine and marking the part as available on the target machine. Responsive to determining that the inexact part is available on the target machine, the hardware processor may be further operable to perform determining whether the inexact part is convertible to a format of the part. Responsive to determining that the inexact part is convertible to the format of the exact part, the hardware processor may be further operable to perform converting the inexact part to the format of the part and marking the part as available on the target machine. Responsive to determining that the inexact part is not convertible to the format of the exact part, the hardware processor may be further operable to perform marking that inexact part is available on the target machine and converting any dependencies associated with the inexact part to a dependent part and queuing the dependent part in the queue. The hardware processor may be further operable to perform repeating of the processing of the queue until the queue is empty. The hardware processor may be further operable to perform creating the virtual machine image comprising the parts and the inexact parts that have been marked as available on the target machine.

A system of reconstituting a machine image, in one aspect, may include a hardware processor and a memory coupled with the hardware processor. The hardware processor may be operable to perform receiving a specification of a machine image identifying attributes of the machine image, a policy specification associated with the attributes of the machine image, and an identifier of a target machine on which the machine image is to be reconstituted. The hardware processor may be further operable to perform identifying constituent parts of the machine image based on the specification. The hardware processor may be further operable to perform queuing the constituent parts, part by part, in a queue stored in the memory. The hardware processor may be further operable to perform processing the constituent parts in the queue. The hardware processor processing the constituent parts in the queue may include removing a part from the queue and determining whether the part is available on the target machine. Responsive to determining that the part is available on the target machine, the hardware processor may be further operable to perform marking the part as available on the target machine. Responsive to determining that the part is not available on the target machine, the hardware processor may be further operable to perform determining whether an inexact part corresponding to the part is available on the target machine based on the policy specification. Responsive to determining that the inexact part is not available on the target machine, the hardware processor may be further operable to perform transferring the part from a source machine via a communication network to the target machine and marking the part as available on the target machine. Responsive to determining that the inexact part is available on the target machine, the hardware processor may be further operable to perform determining whether the inexact part is convertible to a format of the part. Responsive to determining that the inexact part is convertible to the format of the exact part, the hardware processor may be further operable to perform converting the inexact part to the format of the part and marking the part as available on the target machine. Responsive to determining that the inexact part is not convertible to the format of the exact part, the hardware processor may be further operable to perform marking that inexact part is available on the target machine and converting any dependencies associated with the inexact part to a dependent part and queuing the dependent part in the queue. The hardware processor may be further operable to perform repeating of the processing of the queue until the queue is empty. The hardware processor may be further operable to perform creating the machine image comprising the parts and the inexact parts that have been marked as available on the target machine.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
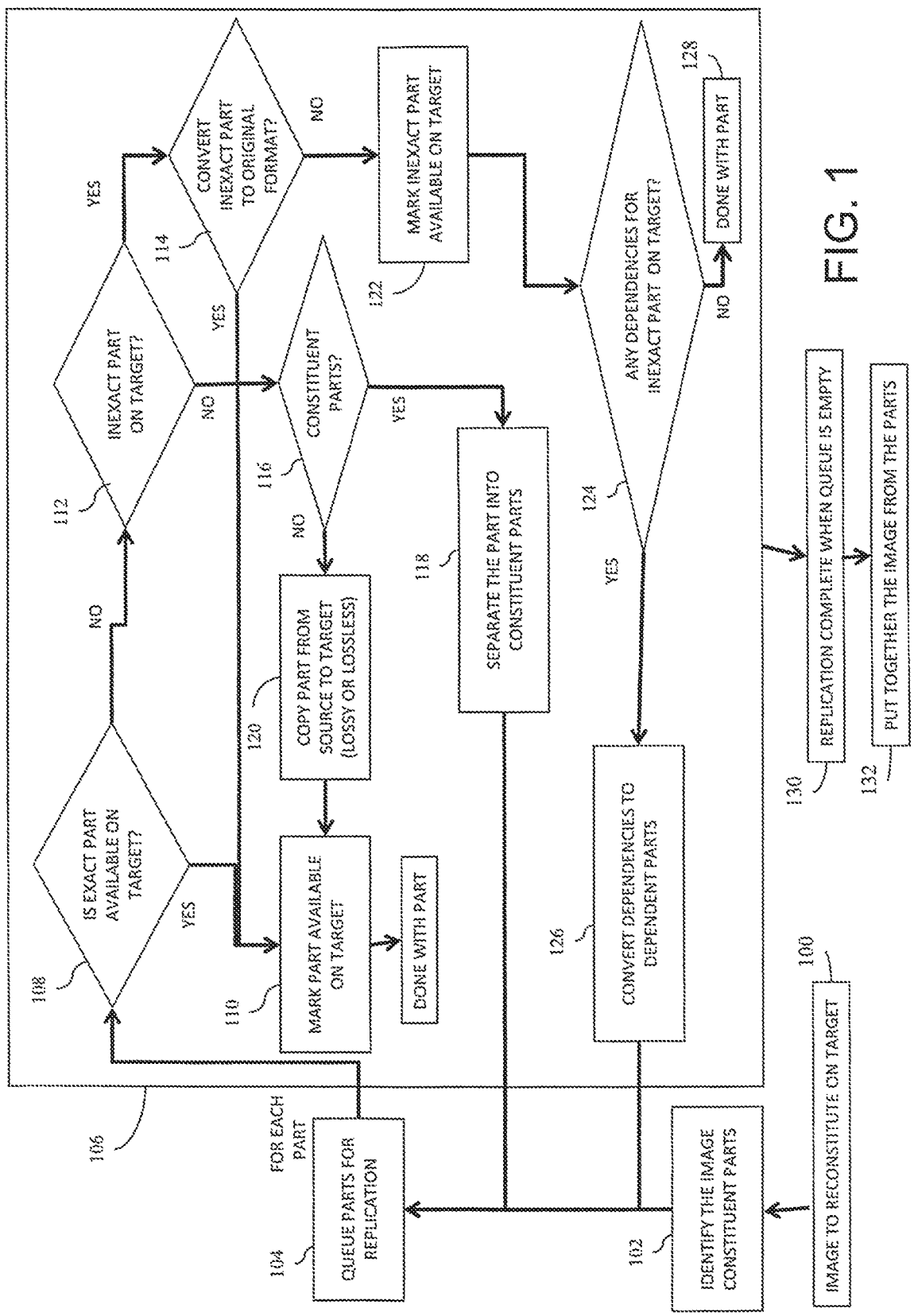
FIG. 1 is a flow diagram illustrating an inexact replication and reconstitution algorithm in one embodiment.

System, method and techniques are presented that reconstitute machine images such as virtual machine images. It is recognized that in reconstituting a virtual machine image, a bit identical copy is not required. Instead, "computational reproducibility" is desired. The system, method and techniques may implement "inexact reconstitution" that is application and/or user policy aware. Such technique makes reconstitution of usable images faster with the use of locally accessible inexact similar data. While the description herein refers to a reconstituting of virtual machine images in general, the system, method and/or techniques are also applicable to reconstituting container images and/or bare-metal images, and therefore, the methodologies described herein are not limited to virtual machine images.

In some embodiments, similarity detection methods such as Context Triggered Piecewise Hashing (CTPH) Rolling Hash, Fuzzy Hashing, and/or Minhash and Locality sensitive hashing may be used. CTPH Rolling Hash creates signatures that can be used to identify modified versions of known files, even if data has been inserted, modified, or deleted in the new files. Fuzzy Hashing compares distinctly different items and determines a fundamental level of similarity, e.g., expressed as a percentage. Minhash and Locality sensitive hashing represents similarities between objects using probability distributions over hash functions.

Inexact "good enough" replication may be performed using locally accessible content, for example, content that is geographically nearer. Nearness may be based on being cost effective based on a policy, e.g., bandwidth, geography, and/or others. This may result in quality degradation or improvement of Virtual Machine images where quality is the user and/or application perceived similarity to exact image. This, for example, is useful if speed of replication carries a much higher weight than the exact matching during replication.

In some embodiments, VM images may be represented as semantically marked up structured data. Converting a disk image using this new replication does not necessarily produce a bit-for-bit identical copy of the original because the image restore is done by creating one or more empty file systems and then recreating the VM image's files. The restored data can be different, be larger or smaller in size and appear at different disk blocks than it did in the original. Different applications may be updated to accept the restored VM images.

In some embodiment, the replication is relaxed from syntactically identical (block level) virtual machine images to semantically identical parts or chunks. Fuzzy hashing (approximate hash based matching) or CTPH (Context Triggered Piecewise Hashing) may be used for determining reducibility for semantically identical parts or chunks if content type of data is known. Different methods may be used to compute similarity. As long as the VM image is computationally equivalent, e.g., similarity (e.g., similarity score) perceived by a machine process or human is above a defined threshold, the parts may be considered. For semantically (e.g., not syntactically) identical parts or chunks, the system and/or method in some embodiments may use approximate hash based matching (Fuzzy Hashing) of features of data chunks. In some embodiments, the amount (e.g., weighted sum) of identical features determines the similarity between parts or chunks. For example, the MinHash algorithm (set Similarity probabilistic data structures) may be used for comparing the similarity of parts to provide a quick estimate enough to filter those VM images that are not similar to each other. Thus, it is possible that the binary content of the parts is different (therefore the hash code MD5 or SHA1 will be different), but the parts are semantically the same.

The following describes regenerating a virtual machine image or zip file containing multiple additional files with known types on a target machine. The virtual machine image may be regenerated from one or multiple source machines. As an example, consider that a part or chunk is a presentation file. The presentation can be in the form of a Portable Document Format (PDF) file, a PPT file (a presentation file format used by Microsoft® PowerPoint) or an Open Document Presentation (ODP) file (a presentation file format used by OpenOffice.org), or another.

With a mechanism to determine that the target machine contains the content that can recreate the same visual representation, a file need not be sent across from a source machine to the target machine, if already available on the target machine, for example, even in alternative form. In another aspect, if the source file (PPT format or ODP format) exists on the target machine or environment (accessible in another image or elsewhere), a PDF file may be regenerated on the target without transferring the PPT/ODP or PDF. The content may be available in separate multiple files on the target machine and may be combined or alternatively subdivided.

Source nodes may have the requested part in the form of "source code" that may be compiled using build tools to create the executable binaries on the target. Alternatively, the "source code" may be converted to "obfuscated code" before transfer or reconstitution by converting the "source code" into a format difficult for humans to understand if the policy requires making it difficult to reverse-engineer. Yet another example is anonymization with source information sanitization where the policy is privacy protection.

Another example is an audio file or video snippet or picture image belonging to a VM image with different bit rate and different format. Lossy compression can be used to transfer data. As long as the user perceived similarity with similar audio/video file on target is within required user perception, original data need not be replicated to the target machine. Yet in another aspect, the file version on the target machine may be older or newer. As long as similarity index is greater than the defined or desired bound (for example 90%), which represents the required details, the user or machine process (e.g., application) may not require exactly the same file to be replicated.

Approximate matching may be computationally expensive. In some embodiments, graphics processing units (GPUs) may be used, for example, which enable lower latency fuzzy matching.

As use case examples, locally accessible Health Care datasets, which cannot or should not be exported, Astronomy datasets, or other such data may be substituted with another during reconstitution instead of original data on source for computationally equivalent results. As another example, a middleware such as different structured query language (SQL) databases may be replaced by one another. As yet another example, NoSQL databases may be replaced with one another.

When similar VM images are available at multiple sites, an option may be provided to choose among images available on a target machine that are most similar to the desired image. This method requires zero transfer time for VM image data, but may present some uncertainty about the similarity on the target machine and also require an effort to make the available image computationally equivalent using build files. On the other hand, transferring the exact image may need transferring a lot of data from some number of source machines to the target machine, for instance, transferring desired blocks from the sources.

The system and method in some embodiments allow reconstitution on the target machine with enough similarity based on policy that satisfies the requirements of user, machine process or application. In some embodiments, the policy specifies the similarity threshold and algorithm for hashing providing a precision-performance tradeoff.

In some embodiments, the system and/or method may check whether data is in a different format, is already available on target, and also check if an application to use (e.g., read) that data in target format is available on the target machine. The system and/or method may reconstitute the new VM image with the data and corresponding applications. During reconstitution of the new VM image with the data, the system and/or method in some embodiments also consider the overhead of packaging the corresponding dependencies (applications) to read that data if corresponding application was available on source image. These dependent packages may already be available locally or need to be downloaded from external sites in which case this cost is also considered. In one aspect, the old application/dependency used to retrieve that data may not even be required for reconstitution on the target VM image if the original data format is no longer present on the target image and will therefore not need to be transferred.

In some embodiments, the similarity detection is dynamic based on the policy rules and VM image attributes. Thus, a method for inexact replication in some embodiments reconstitutes virtual machine images with semantically identical chunks with a tunable knob described through profiles. The process of scanning the tagged parts of the VM images is automated.

FIG. 1 is a flow diagram illustrating an inexact replication and reconstitution algorithm in one embodiment. One or more hardware processors may execute the processing shown in FIG. 1. At 100, image to reconstitute on a target machine may be received. For example, a specification of a virtual machine image identifying attributes of the virtual machine image, a policy specification associated with the attributes of the virtual machine image, and an identifier of a target machine on which the virtual machine image is to be reconstituted may be received or discovered.

At 102, the information about the VM image to be reconstituted is gathered from the library of virtual images and image constituent parts are identified. All the virtual images on all nodes can be considered as the library of images that are pre-scanned into constituent parts. A user or an automatic computer process may add a new image (VM image) to the library and, for example, at that time, provide additional information that allows the VM image to be separated into its constituent parts. In some embodiments, the meta information is stored in the library. Also, it is possible that a user may want to transfer a VM image from a user's computer, e.g., a laptop, to a target node on a datacenter. In that scenario, the laptop may be considered to be another node in the library. As part of the process of transferring this new VM image, the user may also provide sufficient information as input for separating this new image into its constituent parts. One of the virtual images on any source node can be selected for reconstitution on a target node. For instance, via a GUI or API, a user may specify a virtual machine image (e.g., by name or identifier), a target node (e.g., by name or identifier) where the virtual image is to be reconstituted and a policy specification. During reconstitution, the image name or identifier that was selected may serve as the source of information about the parts that are required on the target node. The image, however, need not be the only source for parts. The actual parts used for reconstitution of a VM image on the target node can come from any node that has similar part: thus, other images on target node, or any other nodes can be used as source. In some embodiments, all the virtual images that can be used as source images on all nodes are separated into constituent parts, forming the library of all VM images. For instance, an image's name or identifier in the library represents the VM image that is to be reconstituted on target node. So, for example, the VM image does not need to come from one node, instead the name or identifier specifies which image is required on target node. The actual parts can come from any one or more nodes finally to be reconstituted on the target node (thus accessible on target node). Information may be discovered automatically or received as input that allows separation or identification (collection of meta information) of all VM images into their parts.

In some embodiments, a user may input an identifier or name of a VM image for reconstitution. The virtual image to be reconstituted can be identified by name or another identifier or any searchable features for the image that can serve to identify an image.

In some embodiments, the virtual image to be reconstituted is one of the images in the library. In some embodiments, the source node does not need to be identified. Same image can be stored on multiple source nodes. The parts to be used as source may depend on the similarity of desired part to available parts on any node (each node may have multiple images). In the worst case, the available part with desired 100% similarity may only present on single node on a single source VM image that was selected from the library.

Figure 4:
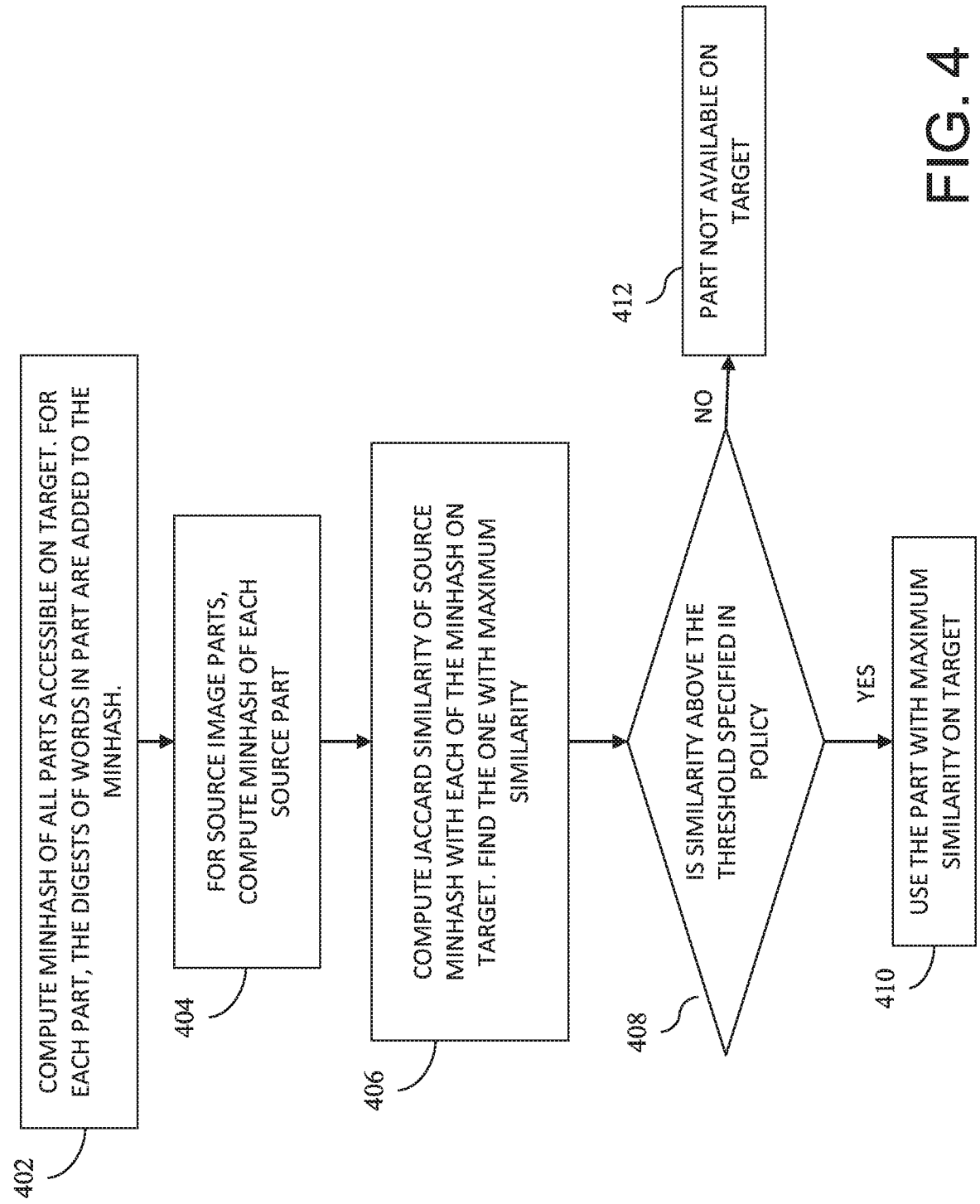
FIG. 4 is a diagram illustrating a method of comparing parts, for example for similarity, in one embodiment.

At 102, if an image to be reconstituted is a new image, a processor computes MinHash for each of the parts (e.g., shown in FIG. 4 at 402 and 404). If it is a known image in the library, the processor gathers the information, so the processor can queue the parts for replication. Each part may include file names (of all files in the part) and the data blocks or files required to reconstitute the parts for the VM image. The information about the parts may be discovered or provided as input (e.g., operating system, relational database and office productivity tool(s) along with corresponding file system information). Additionally, the information may contain attributes that can be used for MinHash computation. For example, the final output is the MinHashes for all the parts of the VM Image. These Minhashes can be used for computation of Jaccard similarity. The processing at 102 can be run from any node, for example, where the meta information (library) is stored.

Constituent parts are one or more directories and files, packages, libraries within a VM image that characterize attributes that can be gleaned or are provided as context for the VM images. These attributes can be compared with parts from other VM images. One way to represent these attributes is using Resource Description Framework (RDF). This RDF may be stored as meta information about the parts in the library when an image is added to the library.

The attributes can have values that are used for different purposes. For example, the attribute "document-type" can have values "doc"/"docx" (office document), "ps" (post-script), "pdf" (portable document format for presentation), "odf (open document format), "ppt", "pptx" (PowerPoint), "tex" (Latex™ source). Additionally, an attribute can be "presentation-type": "editable", "viewable". A "pdf" is viewable. The "doc", "ppt", "pptx" are viewable and editable. "tex" is only editable. For example, a "tex" format requires Latex™ to be installed with additional utilities so that it can be compiled and viewed. ".pdf" is categorized as not editable and requires Adobe® Viewer. The "odf" can be opened using Open Office or Microsoft® Office. The "ppt" and "pptx" can only be opened with Microsoft® Office.

These attributes allow determination of when the part is downloaded if the part is compatible with the policy, for example, that may require a viewable attribute has priority over editable attribute. For example, initially the smallest, view-only document may be downloaded, for example "pdf"; later the larger editable format may be downloaded, for example, "pptx". As another example when a "tex" and "pdf" are both available on source, the smallest format may be the source "tex" file. However, if Latex® and corresponding dependencies are present on the target machine, it may be faster to compile the "tex" to a "pdf" on the target machine than transferring the larger pdf file. Even though viewable has priority, the source "tex" is smaller resulting in both the viewable and editable formats to become available on the target with low amount of data transferred in the tex file. The attributes thus allow for determination of dependent components that need to be accessible by the target machine to complete the image reconstitution at the target.

Additionally, the "viewable only" policy may be used to determine the functionality desired on target. For example, if extensions (pptx or odp) on the source node are not used (as per the policy) there is no need to reconstitute/download these equivalent components. We could just download the pdf that is viewable.

One or more hardware processors may receive a specification of a virtual machine image identifying attributes of the virtual machine image, a policy specification associated with the attributes of the virtual machine image, and an identifier of a target machine on which the virtual machine image is to be reconstituted. The separating at 102, for instance, identifies constituent parts of the virtual machine image based on the attributes.

At 104, the constituent parts are queued. For example, a list of the parts is stored in a queue in a memory, for example, part by part. The queue may be stored in memory, and/or persisted to any storage media. In one embodiment, the parts may be stored in the queue by their priority. Other data structure may be utilized for storing the constituent parts. A constituent part is meta information about the blocks or files, for that part and where (location) the blocks or files for that part are available so that the VM image can be reconstituted. In some embodiments, this "for each part" can be executed in parallel for multiple parts simultaneously.

The processing shown at 106 may be performed for each part identified in the image at 102 and queued at 104. The items (e.g., parts) queued at 104 are processed as shown at 106. At 108, it is determined whether an exact part is available on a target machine. If yes, the part is marked or tagged as available on target at 110. If the exact part is not available on target, as determined at 108, it is determined whether an inexact part is available on the target machine at 112. As an example, the part and inexact part may be files of same type in different formats, a presentation type in "odp", "pptx", or "pdf" formats. The policy specification may also specify what types or formats of parts can be considered as an inexact part to a part. Identifying whether a part is an inexact version of another part may include performing a similarity analysis, for example, implementing techniques such as hashing and Jaccard similarity index or measure. The policy specification may specify or define a threshold similarity value. A part that has a similarity measure, as compared to the part being processed, above the threshold similarity value may be considered an inexact part.

If an inexact part is available on the target machine, as determined at 112, it is determined at 114, whether the inexact part can be converted to original format. For instance, it is determined whether the inexact part is convertible to a format of the exact part. If yes, the inexact part may be converted to the original format and at 110, the part is marked or tagged as available on target.

If an inexact part is not available on the target machine, as determined at 112, it is determined at 116, whether this part can be further divided or separated into constituent parts, e.g., subparts of the part. If yes, the part is further separated into constituent parts at 118, and queued back into the queue of parts at 104. For instance, suppose the part scanned on source image is LiberOffice suite. Suppose also that it is desired to transfer a part called "Office Suite" that is a collection of tools that comprises programs for word processing, spreadsheets, slideshows, diagrams and drawings, database, etc. But neither Liber Office suite, Microsoft® Office Suite nor Open Office Suite is present on target. There may be only Microsoft® Word available on target and also Apache OpenOffice™ Impress. Then by separating the part (e.g., LiberOffice suite) into subparts in the queue, the processor does not need to transfer two tools from the tools suite. Instead, only the rest of the required tools from the suite can be transferred.

If at 116, it is determined that the part does not have constituent parts, the part is copied from a source to the target machine at 120. In some embodiments, the library contains information about where the source part is already available. The processor may select one or multiple source machines for transferring the blocks. For example, a policy may specify to use "minimum network cost=number of bytes to be transferred from source*cost/byte". As another example, the policy may specify the maximize speed of transfer="network bandwidth bytes/s"/"number of bytes to be transferred from source". Lossy or lossless copying may be performed, and at 110, the part is marked or tagged as available on target.

At 114, if it is determined that the inexact part cannot be converted to the original format, at 122, the inexact part is marked as available on target. The required parts are gathered to reconstitute the VM image on the target. By "marking" (e.g., tagging a part listed in a list of parts, or by another method to indicate that the part is available on target), an indication is made that now the part is available for reconstitution on the target. When all required parts are marked as available, e.g., indicated when the replication queue is empty (or earlier if streaming the parts), the part can be used for reconstituting the VM image on the target node.

At 124, it is determined whether there are dependencies for the inexact part that is on the target machine. If yes, then the dependencies are converted to one or more dependent parts at 126, and the one or more dependent parts are queued at 104. If there are no dependencies for the inexact part on the target machine, it is determined that the processing of this part is done at 128, and another part in the queue may be dequeued for processing.

The processing shown at 106 is performed at each part queued at 104. Replication is determined to be completed when the queue is empty, e.g., all parts queued have been processed according to the flow of 106.

A virtual machine image may be created on the target machine, with the parts and the inexact parts that have been marked as available on the target machine, for example, at 130 and 132. For example, at 130, if the queue is empty, it is determined that all parts needed for reconstituting have been gathered, and at 130, the desired VM image is put together to create the VM image.

In some embodiment, replication and/or streaming may continue with parts of higher similarity. Once an inexact VM image that satisfies initial similarity policy is replicated, the policy may contain a continuation section, which specifies that VM image be updated with higher similarity. For example, initial requirement may be to make read only PDF files to be available on target. With intention of later modifying the files, the policy may specify that editable presentation files be replicated. These presentation files may or may not be in original format (e.g., PPT or ODP) present in original image if different presentation format is accessible with lower overhead.

In some embodiments, the policy may be specified in the form of Prolog rules or similar structure. Other formats may be utilized. In some embodiments, the default mechanism may be to reconstitute the fully computationally equivalent image on target. This is changed with the reconstitution policy that may describe components as essential or inessential (e.g., inessential component may be streamed on demand). As an example, a policy may require only the editor (e.g., Microsoft® Word) and presentation (e.g., Microsoft® PowerPoint) to be essential but may not require the database (Microsoft® Access). In this example, the database may be considered as inessential. In this scenario, one would want the essential parts to be available immediately so that the image can be used on target. The inessential parts may be required later and therefore may be streamed only if used. So for example, when the target image is reconstituted, there may be holes (unwritten blocks) that may be filled up only if required (e.g., actually used). Essential semantically equivalent components and the dependencies are required to create the VM image on target. Document editor documents, spread sheets and presentations can each have the viewable or editable attributes. In some embodiments, therefore, although the purpose of each of these document types is different and cannot be interchanged, the policy can group them together to apply rules that are grouped by common categories. In some embodiments, regardless of the document type, if viewable attribute is the only policy requirement, then it can be used to determine the timing requirement for download of viewable components belonging to the Virtual Machine image. As another example, if database on source is tagged as SQL (e.g., MySql) or NOSQL (e.g., Apache Cassandra), it may potentially be replaced correspondingly on target with another SQL (IBM®'s DB2) or NOSQL (MongoDB Inc.'s MongoDB) database if the policy only requires SQL/NOSQL type as a requirement.

In some embodiments, the policy may have the attributes placed in a hierarchy to facilitate processing. For example, viewable/editable->machine readable (JavaScript Object Notation (JSON)/Extensible Markup Language (XML))/human readable (formatted text)/Accessibility options.

If VM/container does not have any desktop environment, instead contains an executable process that only reads documents and processes them, then only "Viewable->Machine Readable" attributes may be needed. However, if a human needs to visualize the document, then the target virtual image that processes this input may need additional components that convert it to human readable form such as a graphical user interface (GUI).

In some embodiments, the user may be allowed to enter or specify the default policy rules and can add, update, and/or remove the rules for each VM image that is transferred. In some embodiments, the VM images on the nodes (computers) or datacenters may be introspected, scanned and/or tagged in background process. The user can interact with a GUI or an application programming interface (API) that specifies the source image, the target node and policy to be applied for reconstitution. For example, the user may input via the GUI or API the source image, the target machine or node, and policy.

In some embodiments, the GUI may provide a visualization that informs the user with the download progress as each part and its dependencies are reconstituted. The target machine or node may identify and retrieve the parts from other files on the same node or over the network based on policy requirements subject to minimizing the total cost, time, network bandwidth for VM reconstitution.

Figure 2:
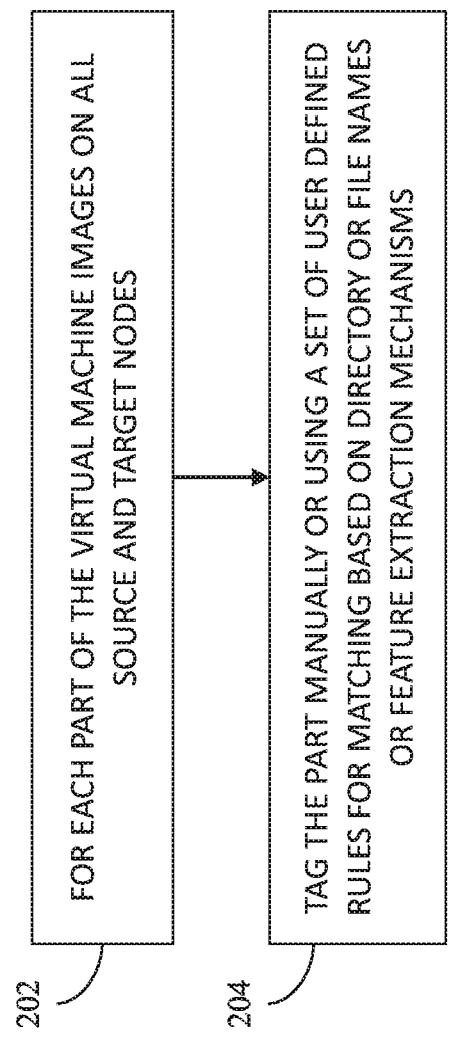
FIG. 2 is a diagram illustrating a method of tagging of parts with attributes in one embodiment.

FIG. 2 is a diagram illustrating a method of tagging of parts with attributes in one embodiment. The method may be executed one time for each new VM image, for instance, which may be added or created on a node (a machine). The node or the machine, for instance, belongs to the image library. For example, a user may explicitly create a new VM image and add it along with the attributes to the library. The addition of the VM image may be done from any node that has access to the library service (that exposes application programming interfaces (APIs) to e.g., add, delete, and/or modify an image). In another aspect, a new VM image may be detected by a processor automatically by looking or searching in a particular directory on each node for new images. The minhash computation occurs on the node where that VM image is accessible.

At 202, for each part of virtual machine images on all source and target nodes, the part may be tagged manually or automatically at 204. In one aspect, a user who adds the image may tag the attributes or words for all parts of the image. For example, the user who adds the VM image to the library may know what components the VM image is composed of and may describe the parts and the attributes and/or words for all parts of the image. Such description may be added by the user to a library of images as attributes or meta information about the VM image. In another aspect, a part may be tagged automatically using a set of user defined rules for matching based on directory or file names or feature extraction mechanisms. For example, it may be possible to discover the attributes depending on the parts. For instance, a processor that detects a VM image may automatically discover the attributes depending on the parts. If the part is a document, it can be tagged using the content or words in the document. If it is a picture image, feature extraction algorithms can be used to find the attributes about what the image contains. For other binary files, the file properties on the file system may provide more details about what is contained in the binary. If it is a directory, there may be user specified rule that will allow to look at well-known file names (e.g., readme.txt, Info.plist, PkgInfo, and/or others) in the root directory and other child directories of the part for additional information about that part. The rules may be part of the executable that scans the parts of the VM image. The file systems in each image may be scanned and separated into folders. The words for the part may serve as input for the minhash, for example, described with reference to FIG. 4.

Figure 3:
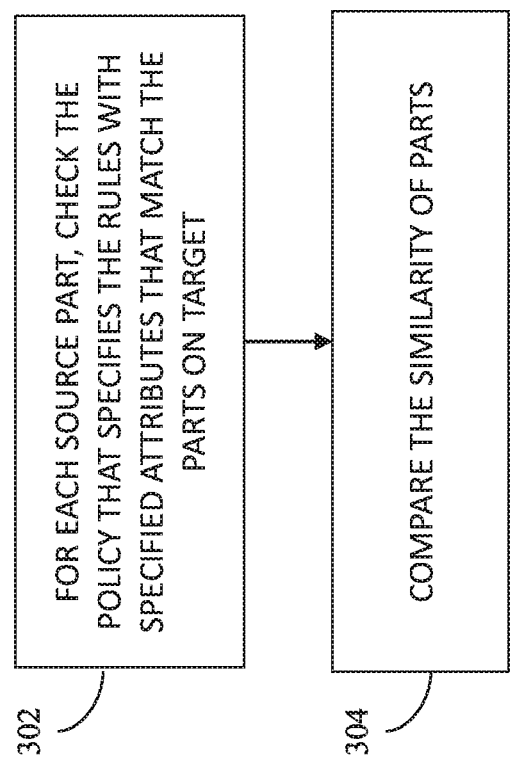
FIG. 3 is a diagram illustrating a method of applying policy in one embodiment.

FIG. 3 is a diagram illustrating a method of applying policy in one embodiment. The method may be executed each time a VM image needs to be reconstituted on a target machine. At 302, for each source part, the policy that specifies the rules with specified attributes that match the parts on target is checked. For instance, a source part may have an associated policy specification, e.g., a specification associated with the virtual image includes a list of attributes of the virtual image and there may be a policy specification associated with each of (and/or a group of) the attributes. At 304, the similarity of parts may be compared. The method shown in FIG. 3, for example, uses a policy to decide if the part with the desired attributes such as "viewable"/"editable" and similarity is available on the target node, e.g., for processing shown at 108 and 112 of FIG. 1.

FIG. 4 is a diagram illustrating a method of comparing parts, for example for similarity, in one embodiment. The method shown in FIG. 4 uses MinHash algorithm. At 402, minhash of all parts accessible on target is computed. For each part, the digests of words in the part are added to the minhash. The processing at 402 may be performed one time for each target node. At 404, for source image parts, minhash of each source part may be computed. The processing at 404 may be performed for each VM image to be transferred from a source machine. At 406, Jaccard similarity of source minhash (e.g., computed at 404) with each of the minhash on target is computed, and the part on the target machine with maximum similarity to the source part is identified and/or selected. In one aspect, a computer processor performing the method may use the Locality Sensitive Hashing to avoid computing the similarity of every pair of minhash signatures by dividing them into bands, and only measure the similarity of a pair of sets if they are identical in at least one band. In one aspect, the minhashes may be pre-computed and saved in the library of images, for example, when a new VM image is added to the library.

At 408, is it determined whether the maximum similarity is above the threshold specified in the policy associated with this part to be reconstituted. If the maximum similarity is above the threshold, at 410, the part with the maximum similarity on the target machine may be used for reconstituting. If not, the part is considered to be not available on the target machine at 412.

The method shown in FIG. 4, for example, may be implemented for determining whether a part is available on a target machine (e.g., the processing shown at 108 and 112 in FIG. 1).

Figure 5:
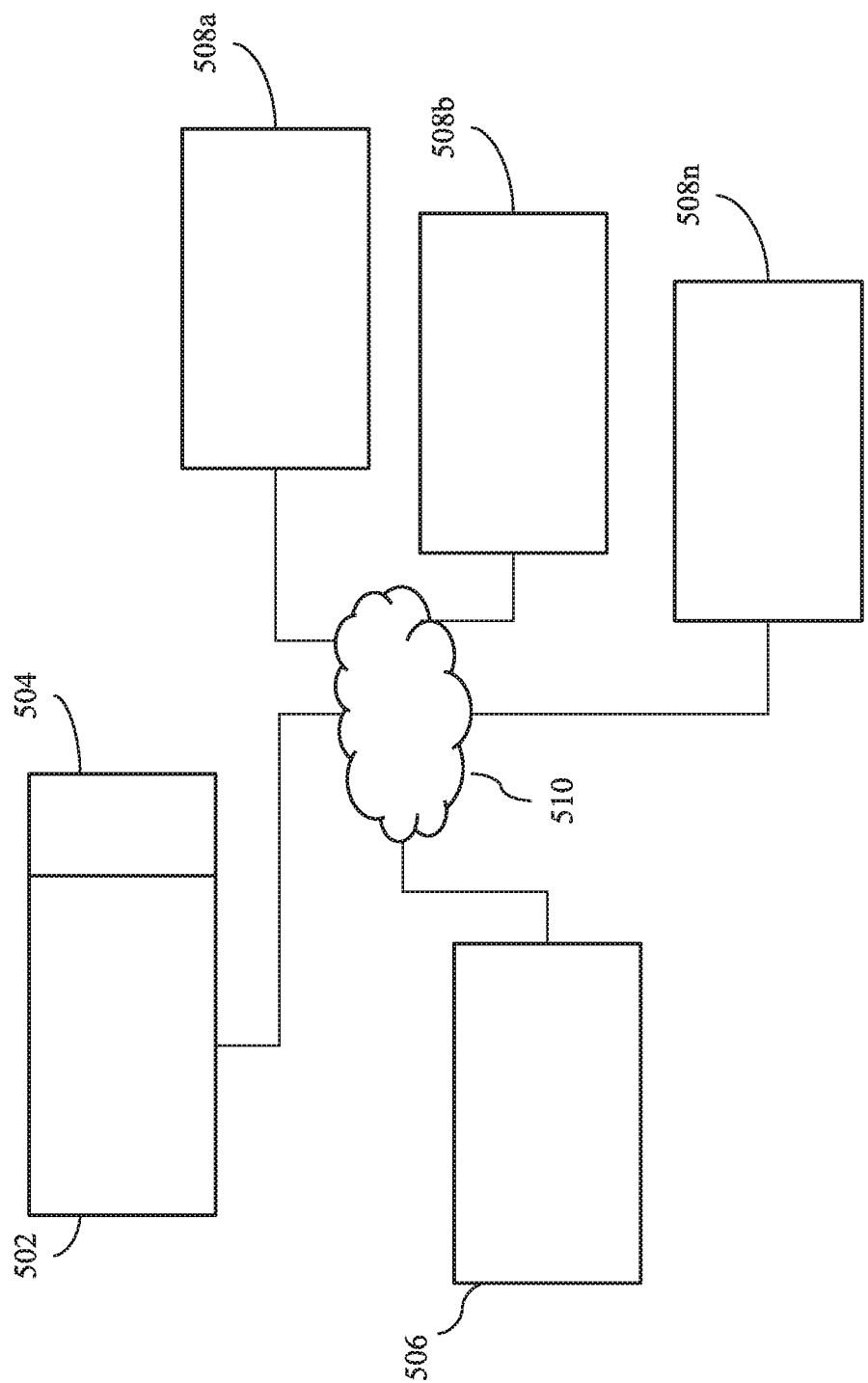
FIG. 5 is a diagram illustrating system components for reconstituting a virtual machine in one embodiment.

FIG. 5 is a diagram illustrating system components for reconstituting a virtual machine in one embodiment. A hardware processor 502 may be coupled with a memory device 504 and perform reconstituting of a virtual machine. The hardware processor 502 may be a processor located locally with a target machine 506. In another aspect, the hardware processor 502 may be a processor located locally with a source machine 508a. Yet in another aspect, the hardware processor may be a processor located remotely from both the target machine 506 and the source machine 508a, for example, on another machine. In some embodiments, there may be a plurality of source machines from where different parts of a virtual machine to be reconstituted may be sourced. The target machine 506 and the source machine 508a or source machines 508b, . . . , 508n, may communicate via a communications network 510. The hardware processor if implemented in a separate machine from the target machine 506 and the source machine 508a or machines 508b, . . . , 508n, also may communicate with the target machine 506 and the source machine 508a or machines 508b, . . . , 508n, via a communications network 510.

The hardware processor 502 may receive a specification of a virtual machine image identifying attributes of the virtual machine image, a policy specification associated with the attributes of the virtual machine image, and an identifier of a target machine (e.g., 506) on which the virtual machine image is to be reconstituted. The hardware processor 502 may identify constituent parts of the virtual machine image based on the specification and queue the constituent parts, for example, part by part, in a queue in the memory device 504. For example, each part is an item in the queue. The hardware processor 502 may process the constituent parts in the queue as follows. The hardware processor 502 removes a part from the queue and determines whether the part is available on the target machine 506. Responsive to determining that the part is available on the target machine 506, the hardware processor may mark the part as available on the target machine 506. Responsive to determining that the part is not available on the target machine 506, the hardware processor 502 may determine whether an inexact part corresponding to the part is available on the target machine based on the policy specification. Responsive to determining that the inexact part is not available on the target machine 506, the hardware processor 502 may transfer or copy the part from a source machine (e.g., 508) via a communication network 510 to the target machine 506 and mark the part as available on the target machine 506. Responsive to determining that the inexact part is available on the target machine 506, the hardware processor 502 may determine whether the inexact part is convertible to a format of the part (e.g., the original format of the part in the virtual machine image as requested). Responsive to determining that the inexact part is convertible to the format of the exact part, the hardware processor 502 may convert or transform the inexact part to the format of the part and mark the part as available on the target machine 506. Responsive to determining that the inexact part is not convertible to the format of the exact part, the hardware processor 502 may mark that an inexact part is available on the target machine 506, and may convert any one or more dependencies associated with the inexact part to a dependent part and queue the dependent part in the queue. The hardware processor 502 may repeat the processing of the queue until the queue is empty. The virtual machine image comprising the parts and the inexact parts that have been marked as available on the target machine 506 can be and are created on the target machine 506.

In some embodiment, determining whether an inexact part corresponding to the part is available on the target machine 506 based on the policy specification may include determining a target machine part having similarity value that is above a similarity threshold defined in the policy speciation associated with the part, the similarity value computed by comparing the target machine part with the part. As an example, the similarity value may be computed as Jaccard similarity. As an example, the dependent part may include an application that can access the inexact part. As an example, the part and inexact part may include files of same type in different formats. In some embodiments, the policy specification associated with the part specifies attributes considered to match the part.

The processing shown in the figures may be performed by one or more hardware processors, for example, one or more central processing units (CPUs), and/or one or more graphics processing units (GPUs). For instance, on a computer system with a CPU coupled with a GPU, the CPU may offload computational functions to the GPU. Other hardware configurations may implement embodiments of the processing or method of the present disclosure.

Figure 7:
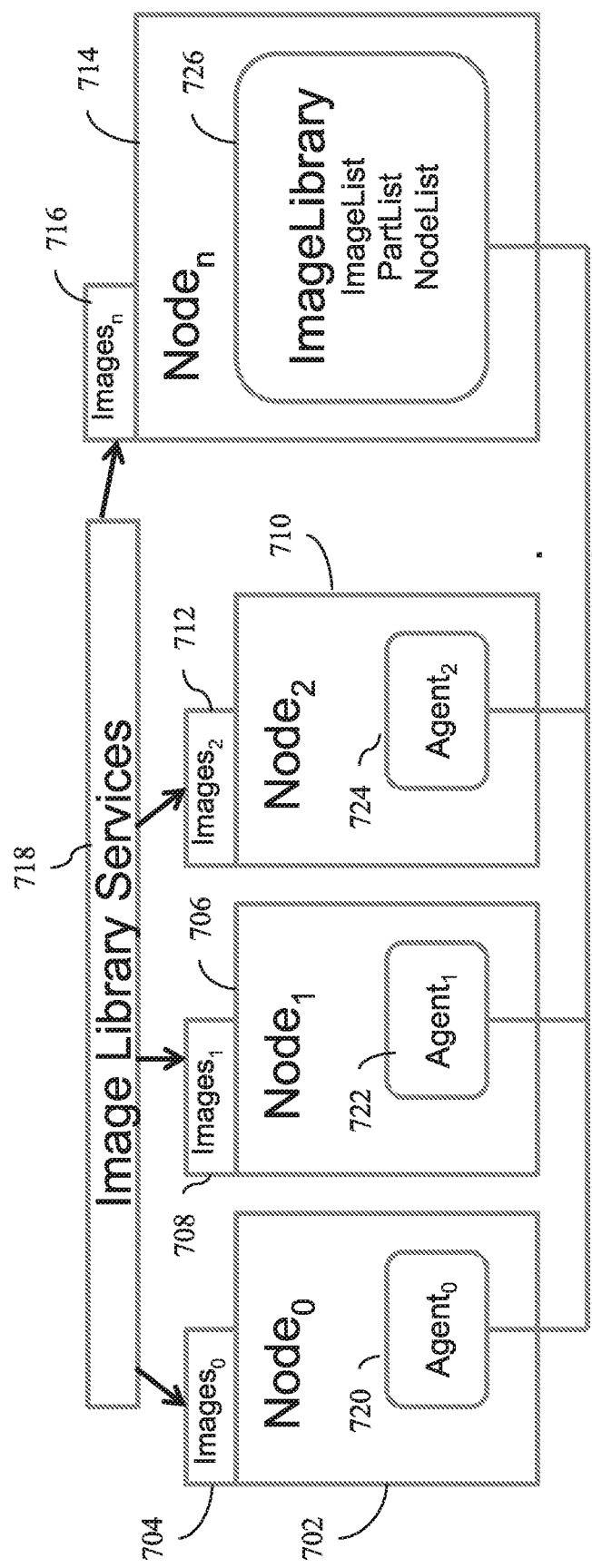
FIG. 7 is a diagram illustrating system architecture and image transfer process in one embodiment of the present disclosure.

FIG. 7 is a diagram illustrating system architecture and image transfer process in one embodiment of the present disclosure. A plurality of nodes or physical machines may include copies of virtual machine images. For instance, node_0 702 may include or store one or more images_0 704, node_1 706 may include or store one or more images_1 708, node_2 710 may include or store one or more images_2 712, and node_n 714 may include or store one or more images_n 716. A node, for example, node_n 714 may also include or store an image library 726. The image library 726 stores information associated with the images stored by the nodes that are part of the library, or e.g., serviced by an image library services 718. The image library services 718 may provide one or more application programming interfaces (APIs) to allow for adding, deleting, modifying images, and inputting attributes associated with the images or to perform other functions related to image transfer process of the present disclosure. Agent programs, e.g., 720, 722, 724, running on respective nodes may communicate with the image library 726, via one or more APIs provided in the image library services 718. For instance, the image library services 718 may be include functions for analyzing VM images, for example, to compute the parts along with minhash for the parts, receiving user inputs for transfer of image to target datacenter, node or physical machine, finding the parts required for an image and queue parts for replication and copy parts that are not already available on target, and reconstituting a target VM image.

Figure 8:
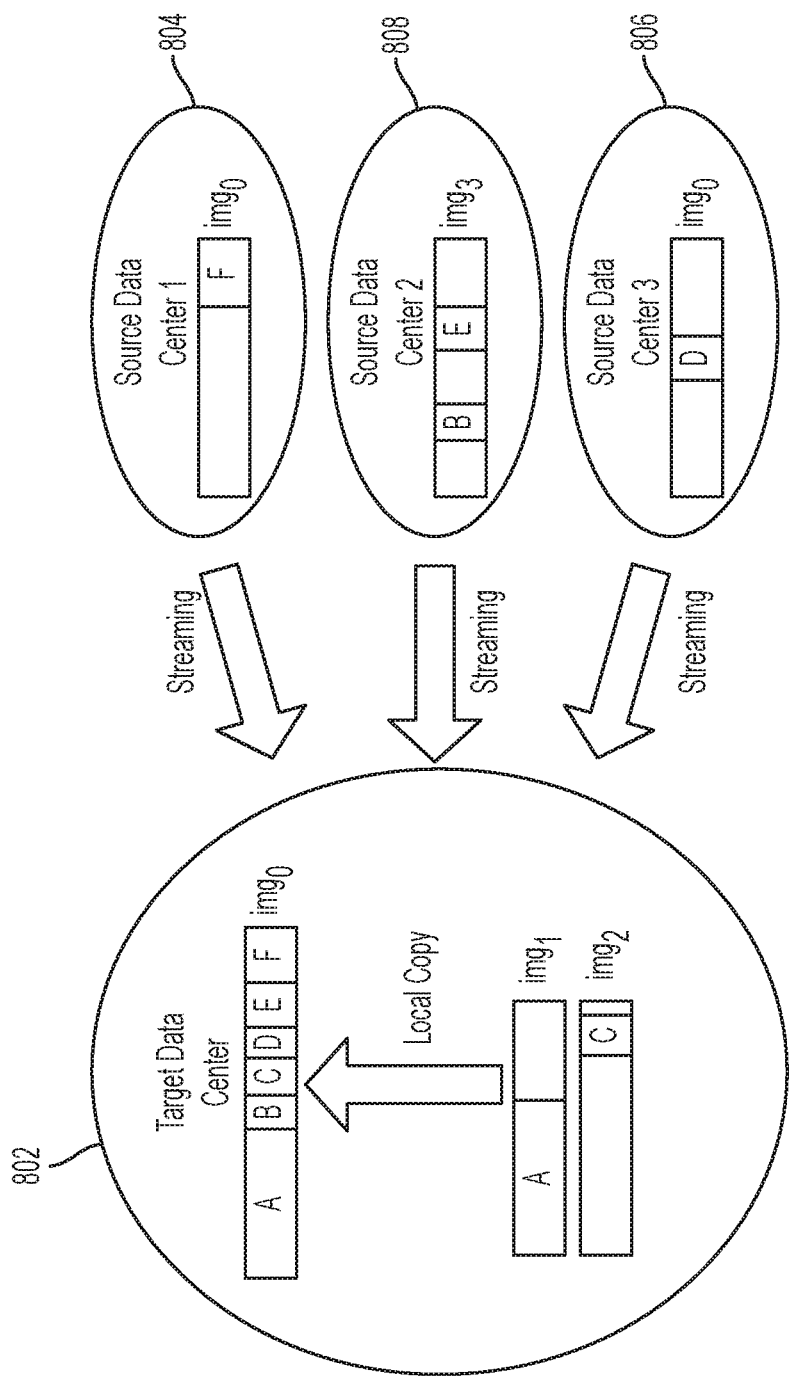
FIG. 8 is another diagram illustrating an image transfer process in one embodiment of the present disclosure.

FIG. 8 is another diagram illustrating an image transfer process in one embodiment of the present disclosure. Consider an image img_0 that needs to be transferred to target data center. The system of the present disclosure in some embodiments may use global image overlap information to identify blocks of the image that are already present at the target data center 802. In the example shown, blocks A and C are available as fragments of images img_1 and img_2, respectively. Those fragments simply copied locally, therefore, completely avoiding network transfer. Remaining content may be concurrently streamed from other data centers either containing image img_0 or other images containing the required content. In this example, blocks F and D are streamed from image img_0 available in data centers 1 and 3 (source node 1 804, source node 3 806), respectively. Blocks B and E are streamed from image img_3 available in data center 2 (source node 2 808). The decision which of the peer data centers, e.g., 804, 806, 808 to use may be made based on available bandwidth and also transfer cost. For instance, in FIG. 8, img_0 is reconstituted on target node 802. For example, inexact parts (A, C) may be available locally in other images in the target Node 802, while the remaining parts (B, E, F, D) are concurrently copied from other Source Nodes, for example, 804, 806, 808. Parts may be copied from any image, not only from Img_0.

A computer readable storage medium storing a program of instructions executable by a machine to perform a method of reconstituting a virtual machine image may be also provided. The method performed by the machine according to the program of instructions may include receiving a specification of a virtual machine image identifying attributes of the virtual machine image, a policy specification associated with the attributes of the virtual machine image, and an identifier of a target machine on which the virtual machine image is to be reconstituted; identifying constituent parts of the virtual machine image based on the specification; queuing the constituent parts, part by part, in a queue; processing the queue by: removing a part from the queue; determining whether the part is available on the target machine; responsive to determining that the part is available on the target machine, marking the part as available on the target machine; responsive to determining that the part is not available on the target machine, determining whether an inexact part corresponding to the part is available on the target machine based on the policy specification; responsive to determining that the inexact part is not available on the target machine, transferring the part from a source machine via a communication network to the target machine and marking the part as available on the target machine; responsive to determining that the inexact part is available on the target machine, determining whether the inexact part is convertible to a format of the part; responsive to determining that the inexact part is convertible to the format of the exact part, converting the inexact part to the format of the part and marking the part as available on the target machine; responsive to determining that the inexact part is not convertible to the format of the exact part, marking that inexact part is available on the target machine and converting any dependencies associated with the inexact part to a dependent part and queuing the dependent part in the queue. The method performed by the machine according to the program of instructions may also include repeating the processing of the queue until the queue is empty; and creating a virtual machine image comprising the parts and the inexact parts that have been marked as available on the target machine.

The determining whether an inexact part corresponding to the part is available on the target machine based on the policy specification may include determining a target machine part having similarity value that is above a similarity threshold defined in the policy speciation associated with the part, the similarity value computed by comparing the target machine part with the part.

The similarity value may be computed as Jaccard similarity. The dependent part may include an application that can access the inexact part. The part and inexact part may include files of same type in different formats. The policy specification associated with the part may specify attributes considered to match the part.

Figure 6:
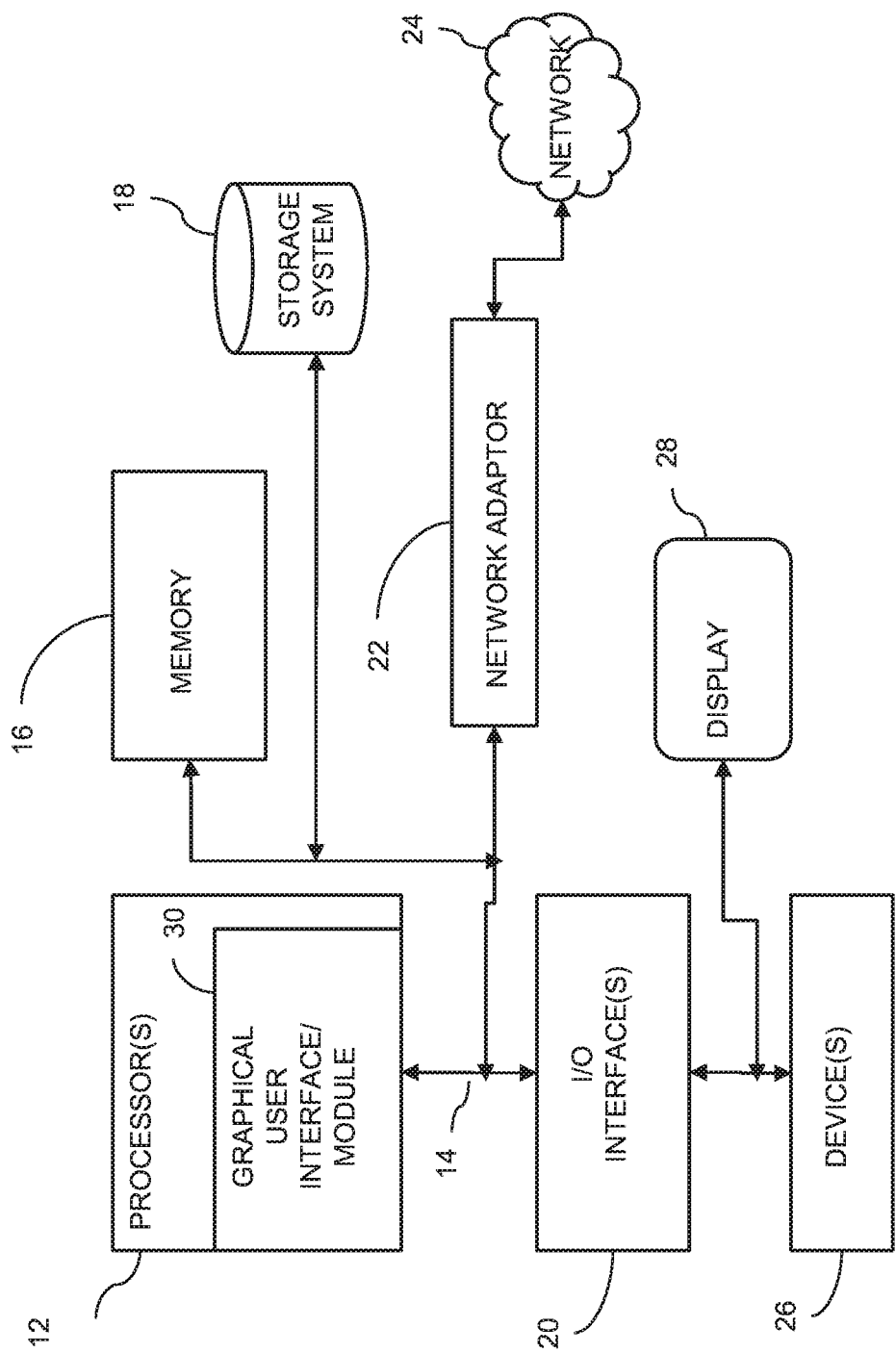
FIG. 6 illustrates a schematic of an example computer or processing system that may implement a virtual machine reconstituting system in one embodiment of the present disclosure.

FIG. 6 illustrates a schematic of an example computer or processing system that may implement a virtual machine reconstituting system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of reconstituting a virtual machine image, the method performed by at least one hardware processor, the method comprising:

receiving a specification of a virtual machine image identifying attributes of the virtual machine image, a policy specification associated with the attributes of the virtual machine image, and an identifier of a target machine on which the virtual machine image is to be reconstituted;

identifying constituent parts of the virtual machine image based on the specification;

queuing the constituent parts, part by part, in a queue;

processing the queue by:

removing a part from the queue;

determining whether the part is available on the target machine;

responsive to determining that the part is available on the target machine, marking the part as available on the target machine;

responsive to determining that the part is not available on the target machine, determining whether an inexact part corresponding to the part is available on the target machine based on the policy specification;

responsive to determining that the inexact part is not available on the target machine, transferring the part from a source machine via a communication network to the target machine and marking the part as available on the target machine;

responsive to determining that the inexact part is available on the target machine, determining whether the inexact part is convertible to a format of the part;

responsive to determining that the inexact part is convertible to the format of the exact part, converting the inexact part to the format of the part and marking the part as available on the target machine;

responsive to determining that the inexact part is not convertible to the format of the exact part, marking that inexact part is available on the target machine and converting any dependencies associated with the inexact part to a dependent part and queuing the dependent part in the queue;

repeating the processing of the queue until the queue is empty; and creating a virtual machine image comprising the parts and the inexact parts that have been marked as available on the target machine.

2. The method of claim 1, wherein the determining whether an inexact part corresponding to the part is available on the target machine based on the policy specification comprises determining a target machine part having similarity value that is above a similarity threshold defined in the policy speciation associated with the part, the similarity value computed by comparing the target machine part with the part.

3. The method of claim 2, wherein the similarity value is computed as Jaccard similarity.

4. The method of claim 1, wherein the dependent part comprises an application that can access the inexact part.

5. The method of claim 1, wherein the part and inexact part comprise files of same type in different formats.

6. The method of claim 1, wherein the policy specification associated with the part specifies attributes considered to match the part.

7. A system of reconstituting a virtual machine image, comprising:

a hardware processor;

a memory coupled with the hardware processor;

the hardware processor operable to perform:

receiving a specification of a virtual machine image identifying attributes of the virtual machine image, a policy specification associated with the attributes of the virtual machine image, and an identifier of a target machine on which the virtual machine image is to be reconstituted;

identifying constituent parts of the virtual machine image based on the specification;

queuing the constituent parts, part by part, in a queue stored in the memory;

processing the constituent parts in the queue by:

removing a part from the queue;

determining whether the part is available on the target machine;

responsive to determining that the part is available on the target machine, marking the part as available on the target machine;

responsive to determining that the part is not available on the target machine, determining whether an inexact part corresponding to the part is available on the target machine based on the policy specification;

responsive to determining that the inexact part is not available on the target machine, transferring the part from a source machine via a communication network to the target machine and marking the part as available on the target machine;

responsive to determining that the inexact part is available on the target machine, determining whether the inexact part is convertible to a format of the part;

responsive to determining that the inexact part is convertible to the format of the exact part, converting the inexact part to the format of the part and marking the part as available on the target machine;

responsive to determining that the inexact part is not convertible to the format of the exact part, marking that inexact part is available on the target machine and converting any dependencies associated with the inexact part to a dependent part and queuing the dependent part in the queue;

repeating the processing of the queue until the queue is empty; and creating the virtual machine image comprising the parts and the inexact parts that have been marked as available on the target machine.

8. The system of claim 7, wherein the determining whether an inexact part corresponding to the part is available on the target machine based on the policy specification comprises determining a target machine part having similarity value that is above a similarity threshold defined in the policy speciation associated with the part, the similarity value computed by comparing the target machine part with the part.

9. The system of claim 7, wherein the similarity value is computed as Jaccard similarity.

10. The system of claim 7, wherein the dependent part comprises an application that can access the inexact part.

11. The system of claim 7, wherein the part and inexact part comprise files of same type in different formats.

12. The system of claim 7, wherein the policy specification associated with the part specifies attributes considered to match the part.

13. A system of reconstituting a machine image, comprising:

a hardware processor;
a memory coupled with the hardware processor;
the hardware processor operable to perform:
receiving a specification of a machine image identifying attributes of the machine image, a policy specification associated with the attributes of the machine image, and an identifier of a target machine on which the machine image is to be reconstituted;
identifying constituent parts of the machine image based on the specification;
queuing the constituent parts, part by part, in a queue stored in the memory;
processing the constituent parts in the queue by:
removing a part from the queue;
determining whether the part is available on the target machine;
responsive to determining that the part is available on the target machine, marking the part as available on the target machine;
responsive to determining that the part is not available on the target machine, determining whether an inexact part corresponding to the part is available on the target machine based on the policy specification;
responsive to determining that the inexact part is not available on the target machine, transferring the part from a source machine via a communication network to the target machine and marking the part as available on the target machine;
responsive to determining that the inexact part is available on the target machine, determining whether the inexact part is convertible to a format of the part;
responsive to determining that the inexact part is convertible to the format of the exact part, converting the inexact part to the format of the part and marking the part as available on the target machine;
responsive to determining that the inexact part is not convertible to the format of the exact part, marking that inexact part is available on the target machine and converting any dependencies associated with the inexact part to a dependent part and queuing the dependent part in the queue;
repeating the processing of the queue until the queue is empty; and
creating the machine image comprising the parts and the inexact parts that have been marked as available on the target machine.

14. The system of claim 13, wherein the machine image comprises a container image.

15. The system of claim 13, wherein the determining whether an inexact part corresponding to the part is available on the target machine based on the policy specification comprises determining a target machine part having similarity value that is above a similarity threshold defined in the policy speciation associated with the part, the similarity value computed by comparing the target machine part with the part.

16. The system of claim 13, wherein the similarity value is computed as Jaccard similarity.

17. The system of claim 13, wherein the dependent part comprises an application that can access the inexact part.

18. The system of claim 13, wherein the part and inexact part comprise files of same type in different formats.

19. The system of claim 13, wherein the policy specification associated with the part specifies attributes considered to match the part.

20. The system of claim 13, wherein the machine image comprises a bare-metal image.

* * * * *